(No Model.)
J. A. BILZ.
PLOW.
No. 299,195. Patented May 27, 1884.
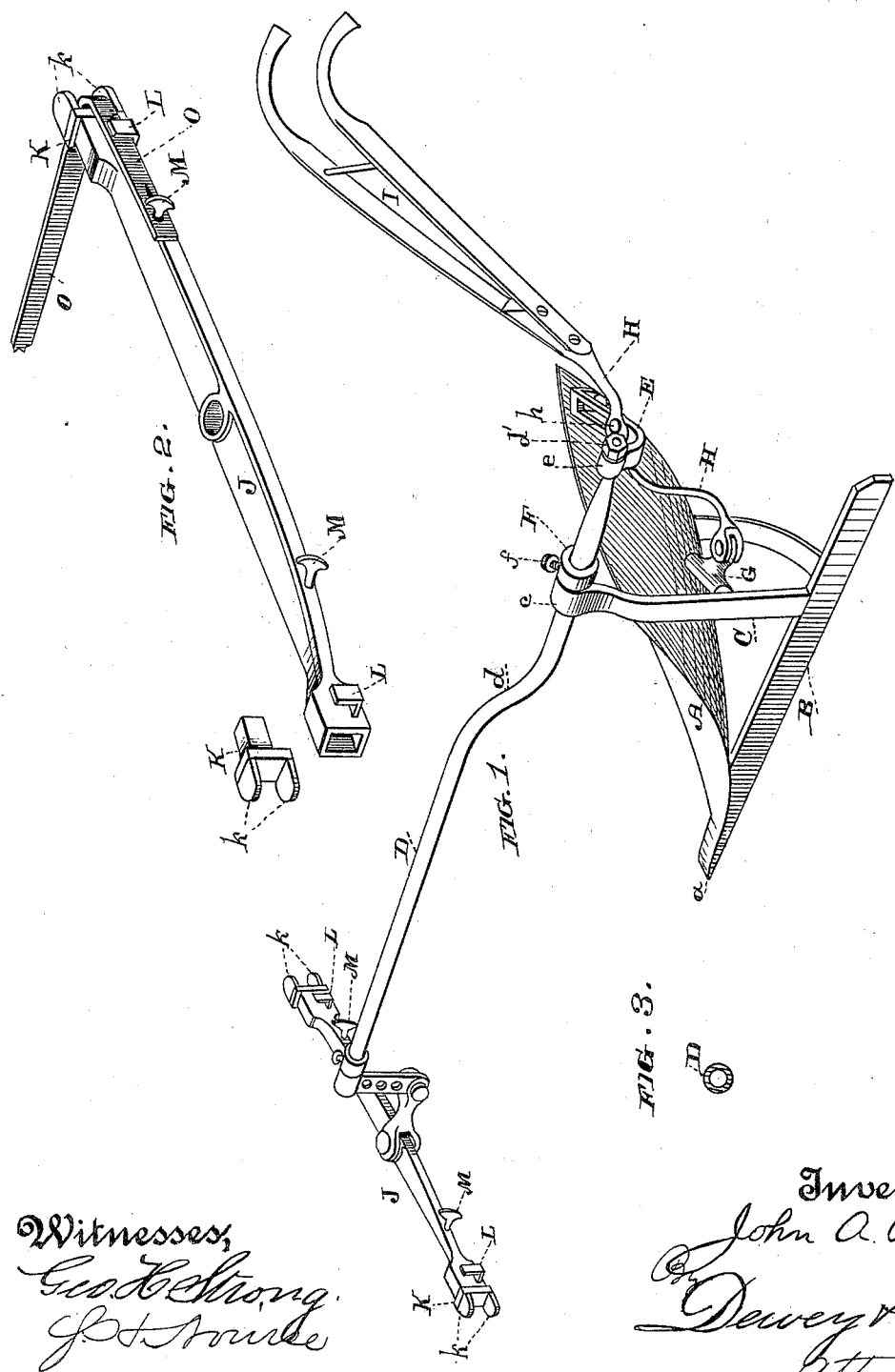
Witnesses,
Geo. H. Strong
J. H. Krouse
Inventor,
John A. Bilz
By Dewey & Co.
Attorneys

UNITED STATES PATENT OFFICE.

JOHN A. BILZ, OF PLEASANTON, CALIFORNIA.

PLOW.

SPECIFICATION forming part of Letters Patent No. 299,195, dated May 27, 1884.

Application filed March 5, 1884. (No model.)

*To all whom it may concern:*

Be it known that I, JOHN A. BILZ, of Pleasanton, county of Alameda, and State of California, have invented an Improvement in Plows; and I hereby declare the following to be a full, clear, and exact description thereof.

My invention relates to that class of plows which are especially adapted for use in vineyards and orchards, where it is necessary to get the share close to the vine or tree without injuring its branches.

My invention consists in a peculiarly bent or curved beam mounted in bearings, and adapted to be turned or revolved therein, in laterally-adjustable handles, and in a novel whiffletree, as I shall hereinafter fully explain.

The object of my invention is to provide a plow in which, by turning the beam, the line of draft is moved to one side, to prevent the horse from injuring the vine or tree by allowing him to clear the branches while the share works close up under them, and to give the same advantage to the driver by moving the handles to one side to get them in the line of draft.

It is further the object of the invention to prevent the whiffletree from doing any injury by contact with the trees.

Referring to the accompanying drawings, Figure 1 is a perspective view of my plow. Fig. 2 is a detail view of the whiffletree, showing it removed from the clevis, one of the traces being in position, and one of the cushions, K, being removed to show its seat in the end of the whiffletree. Fig. 3 is a cross-section of the beam D, showing its tubular character.

A is the mold-board, having the usual point, $a$; B the landside, and C the standard, of a plow.

D is the beam. This is preferably, though not necessarily, made of tubular iron or gas-pipe, and is bent at $d$, as shown. Upon the upper end of standard C is formed a socket-bearing, $c$, through which the beam passes, being journaled therein.

Secured to the mold-board on its rear side, near its top, is a piece or bar, E, the free end of which is also formed into a socket-bearing, $e$, which receives the end of the beam D. In these two bearings the beam is journaled, and is held in place by a nut, $d'$, on its end and by a collar, F, set by a screw, $f$, which said collar lies just behind the bearing $c$ and relieves the nut $d'$ of the draft.

Between the mold-board and standard is a piece, G, to which the end of an arm, H, connected with the handles I, is pivoted. This arm is curved, as shown, and extends upwardly over the bar E and to the handles. The bar E is slotted, and receives a bolt, $h$, through the arm H, whereby a guide is formed for moving the handles sidewise.

J is the whiffletree. This is preferably cast. It has sockets formed in each end, in which are fitted the bodies of rubber cushions K, the exposed ends of which have lips or flanges $k$, forming a groove between them. On the back of the whiffletree are guide-pieces L and lugs M. The ends of the traces O are hooked on the lugs and lie in the guides, whence they bend around into the grooves of the rubbers K, and thence forward. By these means, even if the end of the whiffletree should strike the vine or fruit-tree, it will do no injury.

The operation of my plow is as follows: If I desire to get the share under the branches of a row of trees or vines on my right, I loosen the nut $d'$ and turn the beam in its bearings toward the left, by which means I throw its forward end, already bent out of line, to one side, and the horse can clear the branches, while the share runs under them. I also loosen bolt $h$, and move the handles to the left to get in line with the draft and clear the branches. For the opposite row I reverse the movement of the beam and handles.

It will be observed that I can also raise or lower the draft by turning the beam with the bend up or down.

I prefer tubular iron or gas-pipe for the beam, as being cheap and light, and yet strong enough, requiring very little previous work to fit it to its place.

Having thus described my invention, what I claim as new, and desire to secure by Letters Patent, is—

1. In a plow, the mold-board A, provided with a slotted arm, E, extending laterally from its inner side, its outer end terminating in a bearing for the beam D, in combination with the handles I, curved arm H, secured by flanges and bolt, to a projecting lug formed on the piece G, secured between the mold-board and a standard, C, which extends upward and terminates in a bearing for the beam, a collar, F, and set-screw $f$, all constructed to operate as and for the purpose herein set forth.

2. In a plow, and in combination with an adjustable beam, as shown, the whiffletree J, provided on its rear with guides L and lugs M, for securing the traces, the said whiffletree having squared ends recessed, as shown, for the reception of the rubber cushion K, which is provided with flanges, between which the traces pass, and a squared extension adapted to fit the recess or socket formed in the ends of the said whiffletree, all constructed to operate substantially as and for the purpose set forth.

3. In a plow, the mold-board A, having bar E, with socket-bearing $e$, and the standard C, having socket-bearing $c$ in its top, in combination with the bent or curved beam D, journaled in said bearings, the nut $d'$ on its end, and the adjustable collar F, substantially as herein described.

4. In a plow, the mold-board A, having the slotted bar E, with a socket-bearing, $e$, formed in its end, the standard C, having socket-bearing $c$ in its end, and the bent or curved beam D, journaled and secured in said bearings, in combination with the handles I, having arm H, pivoted to a bearing, G, and guided on bar E by a bolt, $h$, through its slot, substantially as herein described.

In witness whereof I have hereunto set my hand.

JOHN A. BILZ.

Witnesses:
S. H. NOURSE,
H. C. LEE.